United States Patent

[11] 3,587,488

| [72] | Inventors | Reinhold Mutke<br>Dusseldorf-Unterbach;<br>Peter Steller, Dusseldorf, Germany |
|---|---|---|
| [21] | Appl. No. | 861,089 |
| [22] | Filed | Sept. 25, 1969 |
| [45] | Patented | June 28, 1971 |
| [73] | Assignee | Vereinigte Kesselwerke Aktiengesellschaft<br>Dusseldorf, Germany |
| [32] | Priority | Nov. 26, 1968 |
| [33] |  | Germany |
| [31] |  | P 18 10 975.6 |

[54] PROCESS AND APPARATUS FOR THE COMBINED DISPOSAL OF RUBBISH AND SEWAGE
18 Claims, 1 Drawing Fig.

[52] U.S. Cl. .................................................. 110/7,
110/10, 110/15, 159/47
[51] Int. Cl. .................................................. F23g 5/00
[50] Field of Search .......................................... 110/7, 8, 8
(P), 10, 15; 71/12; 23/259.1, 259.3; 159/47

[56] References Cited
UNITED STATES PATENTS

| 3,322,079 | 5/1967 | Komline et al. | 110/8 |
| 3,413,937 | 12/1968 | Bojner et al. | 110/8X |
| 3,251,398 | 5/1966 | Greenfield | 71/12X |
| 3,323,575 | 6/1967 | Greenfield | 71/12X |

*Primary Examiner*—Kenneth W. Sprague
*Attorney*—Michael S. Striker

ABSTRACT: Process and apparatus for the combined disposal of rubbish and sewage, the apparatus including a heat-operated evaporator in which liquid sewage is concentrated and a combustion furnace in which the rubbish is burned. The concentrated sewage is adjustably injected into the hot flue gases resulting from burning the rubbish so as to cool these gases and maintain the same at a predetermined temperature.

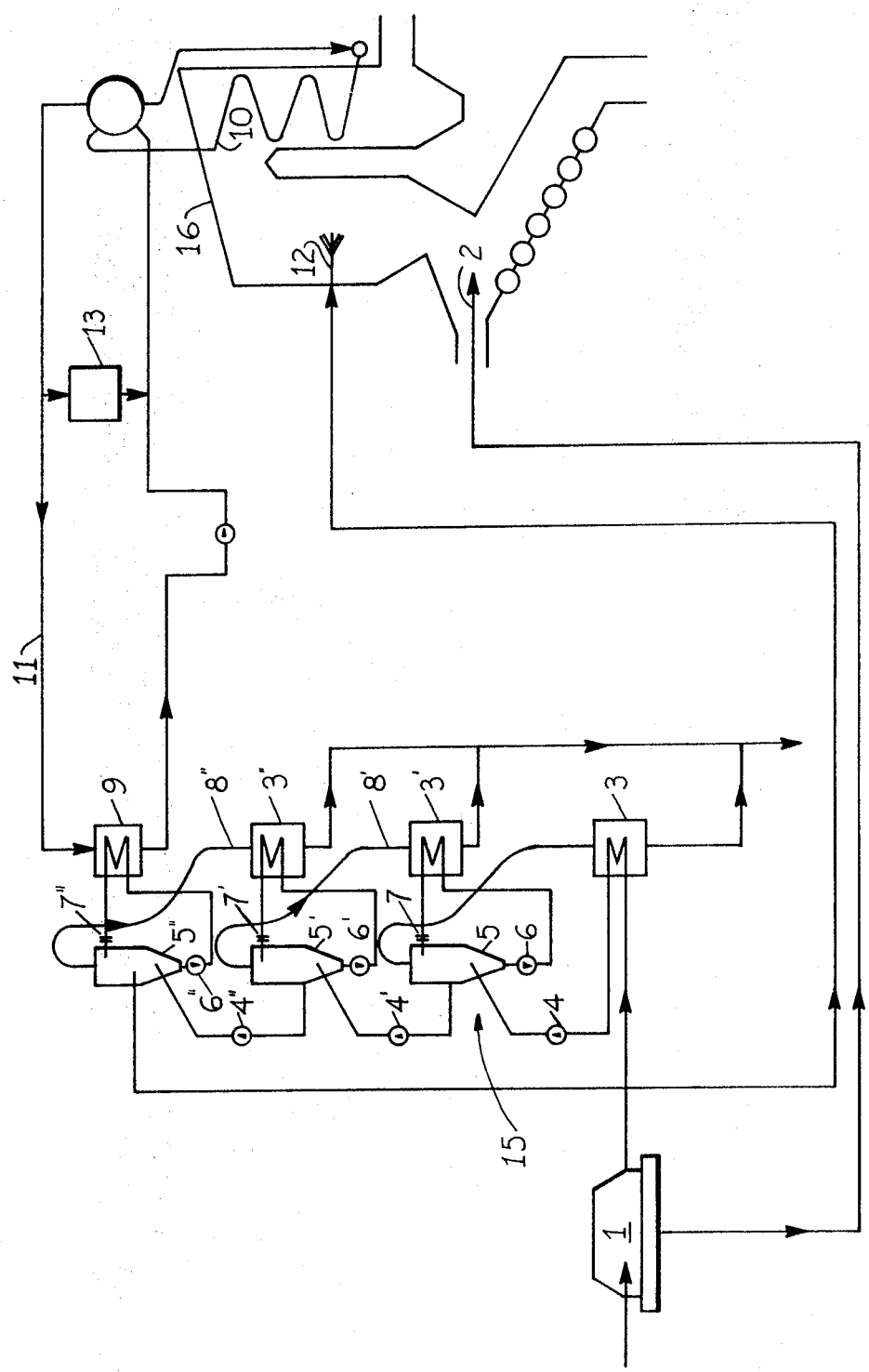

PROCESS AND APPARATUS FOR THE COMBINED DISPOSAL OF RUBBISH AND SEWAGE

BACKGROUND OF THE INVENTION

The present invention relates to a process and apparatus for the combined disposal of rubbish and sewage.

It is becoming increasingly problematic to find a suitable solution for the disposal of rubbish and sewage in a hygienic manner, especially in the cities and larger towns.

In addition to the fact that oftentimes the necessary space for building conventional sewage-treatment plans or for dumping solid wastes, is no longer available, the Official Laws dealing with Public Hygiene and the conditions conductive thereto, prohibit the disposal of garbage and sewage in such a conventional manner.

Already known in the art are methods and apparatus in which rubbish and sewage is disposed of in one simple installation by burning the rubbish in a combustion chamber and by injecting the sewage into the flue gases resulting from such burning.

Such methods and apparatus have the particular advantage that both the rubbish and sewage are disposed of and that, simultaneously, the flue gases are cooled as a result of the sewage injected therein.

However, such installations have the disadvantage that the amount of sewage injected into the flue gases cannot be controlled and that, consequently, quite often the flue gases, as a result of an excessive dosage of injected sewage, are cooled down too much, e.g. from their combustion chamber temperature to a temperature of 200°—300° C. This excessive cooling of the flue gases leads to the end result that only part of the injected sewage is burned while the remainder of the sewage is only dried, thereby taking into consideration that at temperatures beneath at least 700° C. further burning of this dried sewage may not be realized.

In addition, at such temperatures, the flue gases are no longer odorless.

SUMMARY OF THE INVENTION

Object of the present invention is to provide a process and apparatus according to which rubbish and sewage are simultaneously disposed of while the amount of injected sewage is controlled so as to maintain a substantially overall effective burning operation of the disposal apparatus.

Such a process and apparatus according to the invention comprises combustion means for burning the rubbish which includes flue means for the stream of flue gases resulting from burning the rubbish, heat-operated evaporator means for concentrating the sewage, first duct means for conveying the concentrated sewage from the heat-operated evaporator means to the flue means, injecting means for injecting the thus conveyed concentrated sewage in the stream of flue gases passing through the flue means, means for adjusting the amount of injected concentrated sewage dependent upon the temperature of the stream of flue gases after injection of the concentrated sewage so as to cool the flue gases by the injected concentrated sewage only to within a predetermined temperature range, heat exchange means arranged in the flue means after the injecting means for heating a fluid by the partially cooled gases passing through the flue means, second duct means for conveying the heated fluid from the heat exchange means to the evaporator means for the transfer of heat from the heat exchange means to the evaporator means to effect therein concentration of the sewage.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates a preferred embodiment of a disposal apparatus according to the present invention.

DESCRIPTION OF THE PREFERRED EMBODIMENT

Shown in the single FIGURE is a disposal apparatus for the combined disposal of rubbish and sewage and which is seen to comprise a separator unit 1 which, depending on the specific requirements of the apparatus, may be incorporated to separate or filter solid particles from the sewage disposed in this unit for such filtering treatment. This separator unit 1 may, for example, be a centrifuge.

Following the filtering process of the sewage, the solids thereof are conveyed to a combustion furnace 2 by means of a duct member 14 and are combusted or burned in this furnace.

Also combusted in the furnace 2 is the rubbish which is directly disposed therein either manually or mechanically, as may be required.

The liquid sewage emanating from the separator unit 1 is subsequently conveyed to a heat-operated evaporator or flashing installation, generally indicated at 15, for concentration in this installation.

In this installation the liquid sewage is initially received in a first evaporating stage in the form of evaporator chamber 5, via a heat-exchanger 3 and a feed pump 4. From this chamber 5, the partly evaporated liquid sewage is then conveyed to a second heat exchanger 3' via a feed pump 6 and again conveyed back into the chamber 5 via a pressure valve 7 for further evaporation.

This recirculation process of the liquid sewage to and from the chamber 5 via the feed pump 6, the heat exchanger 3' and the pressure valve 7 is repeated and the hot vapors resulting from this repeated evaporation process in the chamber 5 are conveyed therefrom to the heat exchanger 3 via a duct member 8 for heating the liquid sewage emanating from the separator unit 1. Following heating the liquid sewage in the heat exchanger 3, the vapors are then disposed of in the form of a clean condensation product.

The liquid sewage is constantly kept at a certain level by means of the feed pump 4.

The partly concentrated sewage resulting from this repeated recirculation and evaporation process in the first evaporator chamber 5 is then conducted to a second evaporating stage in the form of evaporator chamber 5, the feed pump 6', the heat exchanger 3'' and the pressure valve 7' via a feed pump 4' for further recirculating and concentrating the sewage and, upon treatment of the sewage in the second evaporating stage, the sewage is then further conducted to a third evaporating stage in the form of evaporator chamber 5'', the feed pump 6'', the heat exchanger 9 and the pressure valve 7'' via a feed pump 4'', for still further concentration treatment of the sewage.

Likewise as regards the heating of the liquid sewage in the heat exchanger 3, the hot vapors resulting from repeated evaporation of the sewage in the chambers 5' and 5'', are used to heat the sewage in the preceding stage, i.e., hot vapors are conveyed from the chamber 5' to the heat exchanger 3' via a duct member 8' and hot vapors are conveyed from the chamber 5'' to the heat exchanger 3'' via a duct member 8''. This arrangement is based on the countercurrent principle.

The heat necessary for heating the sewage in the third heat exchanger 9 is, in the embodiment shown, supplied by a heat exchanger 10 via a duct member 11.

The heat exchanger 10, in this instance, is an air-water type heat exchanger operative for the production of saturated steam and is arranged in the path of a flue or smoke-duct 16 which is connected to the combustion furnace 2.

The flue 16 is operative to conduct the stream of hot flue gases resulting from burning the rubbish in the furnace, into engagement with the heat exchanger 10 to subject the same to heat so as to convert the water therein into saturated steam which then is supplied to the heat exchanger 9.

As regards the three successive stages for concentrating the sewage, it is noted that, in this instance, the first stage incorporating the chamber 5 has a lower temperature than the second stage incorporating the chamber 5', and that the third stage incorporating the chamber 5'' has the highest temperature. In this manner the degree of evaporation and subsequent concentration of the sewage is gradually increased such that at the third stage the liquid sewage is completely concentrated.

The sewage thus fully concentrated in the chamber 5'' is then conveyed via a duct member 17 to the flue 16 and, by means of at least one atomizer 12, is injected into the steam of hot flue gases passing through the flue 16.

The concentrated sewage injected into the hot flue gases serve to cool these gases preferably to a temperature of 700°–750° C. at which temperature it has been experimentally found that the concentrated sewage is entirely and completely burned.

Further cooling of the flue gases to a temperature of about 200° C. is effected in the heat exchanger 10 in which, as explained above, the hot flue gases convert the water in the heat exchanger into steam.

It will be appreciated that any number of evaporating stages or evaporator chambers may be employed and that, to an extent, the number of such stages or chambers used, depends on the quantity of sewage to be concentrated.

Also, by utilizing an installation which employs multiple evaporating stages, the heat consumption for the concentration of the sewage usually is less than the heat consumption with a single evaporating stage, again depending on the quantity of sewage to be treated.

Arranged intermediate the heat exchangers 9 and 10 is a thermoregulator 13 which serves to adjustably regulate the supply of saturated steam from the heat exchanger 10 to the heat exchanger 9. By regulating this steam supply to the exchanger 9, the degree of concentration of the sewage in the evaporator installation 15 is varied in that the rate of evaporation of the liquid sewage increases or decreases with the rise or fall of temperature.

In varying the heat and thereby the concentration of the sewage in the evaporator installation 15, also the amount of concentrated sewage is adjusted in that when the temperature in the heat exchanger rises, the recirculation for evaporating the liquid sewage in the respective evaporating stages of the installation decreases which gives as a result that the sewage thus treated is supplied to the flue 16 and injected into the flue gases at a faster rate while when the temperature in the heat exchanger decreases, recirculation for evaporating the liquid sewage increases with the result that the sewage thus treated is supplied to the flue 16 and injected into the flue gases at a slower rate.

Increase in quantity or rate of concentrated sewage is then necessary when the combustion production in the combustion furnace 2 is increased as a result of which also the temperature of the flue gases increases and since it is an object of the present invention to maintain the temperature of the flue gases at preferred temperature of not less than 700°–750° C., such increased rate or quantity of concentrated sewage injected into the hot flue gases serves to cool and maintain these gases at such temperatures.

Contrarily, decrease in quantity or rate of concentrated sewage is then necessary when the combustion production in the combustion furnace 2 is decreased, as a result of which also the temperature of the flue gases decreases, and such decreased quantity or rate of concentrated sewage injected in the less hot flue gases serves to cool these gases to a lesser degree thereby maintaining the same at the desired temperature.

In any event, the quantity or rate of concentrated sewage injected into the flue gases should be varied dependent upon the temperature of the flue gases and maintain the same at 700°–750° C., at which temperatures it has been experimentally found that the concentrated sewage is burned in its entirety.

Alternatively, and in order to vary the concentration of the sewage in the evaporator installation 15, the latter may consists of a great number of individual evaporating stages, and such variation of concentration of the sewage may be effected by either connecting or disconnecting a number of these evaporating stages, in which case the supply of steam supplied to the heat exchanger 9 may be constant.

For example, in concentrating sewage with a liquid content of about 98 percent, it is obvious that with the embodiment shown, more evaporating stages are to be utilized than with a sewage having a liquid content of about 95 percent.

It will be understood, that with the present apparatus, not only sewage and rubbish can be disposed of, but that any other type refuse, such as industrial refuse, may equally well be treated and combusted in the subject apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be protected by Letters Patent is set forth in the appended claims.

We claim:

1. Process for the combined disposal of rubbish and sewage, comprising the steps of burning said rubbish in a combustion chamber so as to form a stream of flue gases; concentrating said sewage in evaporator means; injecting said thus concentrated sewage into said stream of flue gases; adjusting the amount of injected concentrated sewage dependent upon the temperature of said stream of flue gases after injection of said concentrated sewage so as to cool said flue gases by said injected concentrated sewage only to within a predetermined temperature range; conducting said partially cooled stream of flue gases through an air-water heat exchanger so as to transform said water into steam and simultaneously further cool said partially cooled flue gases; and utilizing at least part of said steam for said concentration of said sewage in said evaporator means.

2. A process as defined in claim 1, wherein said predetermined temperature range within which said flue gases are cooled by said injected concentrated sewage is 700°–750° C.

3. A process as defined in claim 1, further comprising the steps of separating solid matter from said sewage prior to said step of concentrating said sewage in said evaporator means; and burning said solid matter in said combustion chamber.

4. A process as defined in claim 3, wherein said separating step is carried out with centrifugal means.

5. Apparatus for the combined disposal of rubbish and sewage, comprising in combination, combustion means for burning said rubbish and including flue means for the stream of flue gases formed by burning of said rubbish; heat-operated evaporator means for concentrating said sewage; first duct means for conveying said concentrated sewage from said heat-operated evaporator means to said flue means; injecting means for injecting the thus conveyed concentrated sewage in the stream of flue gases passing through said flue means; means for adjusting the amount and concentration of injected sewage dependent upon the temperature of said stream of flue gases after injection of said concentrated sewage so as to cool said flue gases by said injected concentrated sewage only to within a predetermined temperature range; heat exchange means arranged in said flue means after said injecting means for heating a fluid by said partially cooled gases passing through said flue means; second duct means for conveying said heated fluid from said heat exchanger means to a said evaporator means for transferring heat from said heat exchange means to said evaporator means to effect therein concentration of said sewage.

6. Apparatus as defined in claim 5, and including means for separating solids from said sewage, and means for conveying the thus remaining liquid of said sewage to said evaporator means.

7. Apparatus as defined in claim 5, wherein said combustion means is a combustion furnace, and wherein said flue means is a smoke-duct connected to said combustion furnace.

8. Apparatus as defined in claim 5, wherein said evaporator means includes flashing means, and means for heating said sewage and communicating with said flashing means for transferring to the same the thus heated sewage, said heating means heating said sewage in response to heat received from said heat exchange means in said flue means.

9. Apparatus as defined in claim 8, wherein said heat exchange means is an air-water heat exchanger for the production of saturated steam.

10. Apparatus as defined in claim 8, wherein said flashing means includes a flashing chamber and wherein said heating means include a heat exchanger.

11. Apparatus as defined in claim 8, wherein said flashing means includes a plurality of discrete flashing chambers communicating with each other for stepwise transferring of said heated sewage from one flashing chamber to the next.

12. Apparatus as defined in claim 8, wherein said heating means includes a plurality of discrete heat exchangers heating said sewage and stepwise increasing the temperature thereof.

13. Apparatus as defined in claim 8, wherein said evaporator means include pump means for feeding said heated sewage from said heating means to said flashing means.

14. Apparatus as defined in claim 5, wherein said first duct means includes pump means for feeding said concentrated sewage from said heat-operated evaporator to said flue means.

15. Apparatus as defined in claim 5, wherein said injecting means includes at least one atomizer dispersing said concentrated sewage into said stream of flue gases.

16. Apparatus as defined in claim 5, wherein said means for adjusting the amount and concentration of said injected sewage includes a thermoregulator arranged intermediate said heat exchange means and said evaporator means for regulating the supply of heat thereto.

17. Apparatus as defined in claim 6, wherein said separating means includes a centrifuge, means for conveying said solids from said centrifuge to said combustion means, and pump means for feeding said solids to said combustion means.

18. Apparatus as defined in claim 5, including pump means arranged in said second duct means for circulating said heated fluid between said heat exchange means and said evaporator means.